US007447419B2

(12) United States Patent
Kuroiwa et al.

(10) Patent No.: US 7,447,419 B2
(45) Date of Patent: *Nov. 4, 2008

(54) WRITABLE STORAGE MEDIUM, APPARATUS AND METHOD OF RECORDING TO A STORAGE MEDIUM

(75) Inventors: Toshio Kuroiwa, Yokohama (JP);
Takayuki Sugahara, Yokosuka (JP);
Junzo Suzuki, Yokohama (JP)

(73) Assignee: Victor Company of Japan, Ltd., Kanagawa-Ken (JP)

( * ) Notice: Subject to any disclaimer, the term of this patent is extended or adjusted under 35 U.S.C. 154(b) by 852 days.

This patent is subject to a terminal disclaimer.

(21) Appl. No.: 10/915,470

(22) Filed: Aug. 11, 2004

(65) Prior Publication Data

US 2005/0008339 A1 Jan. 13, 2005

Related U.S. Application Data

(62) Division of application No. 09/469,246, filed on Dec. 22, 1999, now Pat. No. 6,788,881.

(30) Foreign Application Priority Data

Dec. 24, 1998 (JP) ............................. 1998/366745

(51) Int. Cl.
*H04N 5/781* (2006.01)
(52) U.S. Cl. ......................................... 386/96; 386/125
(58) Field of Classification Search .................. 386/96, 386/125, 105–106, 126, 39
See application file for complete search history.

(56) References Cited

U.S. PATENT DOCUMENTS 4,947,265 A * 8/1990 Hayashi et al. ............... 386/96

(Continued)

FOREIGN PATENT DOCUMENTS

JP 63283375 A 11/1988
JP 01136484 A 5/1989

(Continued)

OTHER PUBLICATIONS

Brandenburg et al, J. Audio Eng. Soc, vol. 45, No. 1/2, Jan./Feb. 1997, pp. 1-21, Overview of MPEG Audio: Current and Future . . . .
Brandenburg, Fernseh- Und Kino-Technik 50, Aug./Sep. 1996, pp. 452-454, 456, 458, Entwicklung eines MPEG-4-Audio-Standards.

*Primary Examiner*—David E Harvey
(74) *Attorney, Agent, or Firm*—Jacobson Holman PLLC

(57) ABSTRACT

A writable storage medium has a first storage area divided into a plurality of sectors having the same data capacity and a second storage area. The first storage area stores at least encoded moving picture data and encoded audio data. The second storage area stores at least first information indicating whether the audio data is silence data, second information indicating an encoding method by which the audio data has been encoded at a constant bit rate and third information indicating the number of audio channels related to the audio data. The first and second storage areas may further store encoded bitmap video data and data identification information indicating whether the bitmap video data is invisible data, respectively. The first information is detected to determine whether the first audio data is silence data. If the first audio data is judged as the silence data, second audio data to be after-recorded is encoded by the encoding method the same as the method for the first audio data at the bit rate the same as that for the first audio data in response to the second and third information. The encoded second audio data is written over the first audio data. The data identification information is detected to determine whether the first bitmap video data is invisible data. Second bitmap video data to be after-recorded is encoded if the first bitmap video data is judged as the invisible data. The encoded second bitmap video data is written over the first bitmap video data.

3 Claims, 4 Drawing Sheets

U.S. PATENT DOCUMENTS

| | | | |
|---|---|---|---|
| 5,596,564 A | 1/1997 | Fukushima et al. | 369/275 |
| 5,745,643 A * | 4/1998 | Mishina | 386/106 |
| 5,905,845 A * | 5/1999 | Okada et al. | 386/98 |
| 6,219,488 B1 * | 4/2001 | Mori et al. | 386/105 |
| 6,222,806 B1 * | 4/2001 | Mori et al. | 369/53.32 |
| 6,381,403 B1 * | 4/2002 | Tanaka et al. | 386/106 |
| 6,393,206 B1 * | 5/2002 | Yagi et al. | 386/125 |
| 6,577,811 B1 * | 6/2003 | Kikuchi et al. | 386/98 |

FOREIGN PATENT DOCUMENTS

| | | |
|---|---|---|
| JP | 04077870 A | 3/1992 |
| JP | 04175081 A | 6/1992 |
| JP | 05314492 | 11/1993 |
| JP | 07130088 | 5/1995 |

* cited by examiner

WRITABLE STORAGE MEDIUM, APPARATUS AND METHOD OF RECORDING TO A STORAGE MEDIUM

This is a Divisional of application Ser. No. 09/469,246 filed Dec. 22, 1999 now U.S. Pat. No. 6,788,881.

BACKGROUND OF THE INVENTION

The present invention relates to a storage medium and an apparatus and a method of recording and reproducing encoded data thereto and therefrom. Particularly, this invention relates to a writable storage medium, and an apparatus and a method of recording and reproducing signals, such as, audio, video and bitmap video signals to and from the storage medium.

With the development of recent information processing technology, digital audio and/or video signals are compressed for recording onto storage media. Optical discs have been considered as one of main storage media for random accessibility and portability.

Moving picture signals require advanced compression techniques for efficient usage of limited storage capacity of storage media due to their large amounts of data compared to audio signals.

Among such compression techniques, data compression processing using the inner frame correlation within one frame (unit of picture) and the correlation between frames that are close to each other on the time base are well known.

These data compression techniques require variable bit rate (VBR) compression encoding processing that results in substantial variation of data amount per frame of moving pictures according to complexity of frame pictures and the degree of correlation between frames.

On the other hand, audio signals are mostly compressed by constant bit rate (CBR) compression encoding processing that produces encoded data of constant bit rate per predetermined period of time due to relatively small amount of data of audio signals.

In addition to moving picture video signals and audio signals, bitmap video signals require compression encoding processing when stored on storage media.

Bitmap video signals are used for overlaying subtitles on moving pictures, for instance. Moving picture signals, audio signals and bitmap video signals are recorded on digital versatile discs (DVDs). Subtitles of bitmap video signals can be selectively displayed because they are encoded separately from moving pictures. Bitmap video signals are also used for overlaying graphics to modify moving pictures.

Storage media, such as DVDs, for storing those signals are formed with successive sectors thereon. Each sector is used for storing a small but constant amount of data. Encoded data are separately stored on the sectors. Access (read/write) to these media is usually performed for each sector. Encoded data of moving picture signals, audio signals and bitmap video signals are stored on different sectors for better accessibility.

These encoded data are recorded on a storage medium in the form of program bitstream that is defined by ISO/IEC13818-1 (MPEG standards) to meet the following requirements:

Encoded data of moving picture signals, audio signals and bitmap video signals are multiplexed for recording on sectors of a storage medium because these signals are in synchronism with each other. The rate of reading these signals from the storage medium is controlled in accordance with the bit rates of the moving picture signals that have been compressed by the VBR compression encoding processing.

Program bitstreams of encoded data are recorded on a storage medium so that packs (unit of data transfer) and sectors exactly meet each other. Each pack carries encoded data of signals, such as, moving picture signals, audio signals and bitmap video signals. Encoded data of these signals are multiplexed in unit of pack. Each pack also carries time data, such as, a system clock reference (SCR), for controlling the rate of signal reading. The packs also include several data, such as, data for identifying the encoded data.

Recording encoded data with multiplexing in unit of pack as disclosed above is, however, disadvantageous in after-recording compared to usual audio/video recording, for example, by VHS (Registered Trademark) video tape recorders.

VHS offers after-recording for recording audio signals only to follow video signals already recorded on a magnetic tape.

In VHS systems, video signals are separated into luminance signals and crominance signals. The luminance signals are modulated by frequency modulation. On the other hand, the crominance signals are converted into frequencies lower than the frequency-modulated luminance signals. Audio signals are frequency-modulated into the frequencies between the converted crominance signals and the frequency-modulated luminance signals.

These signals are processed by frequency-division multiplex and recorded on a magnetic tape by rotary magnetic heads. The signals are recorded as analog signals on main tracks that are inclined in the longitudinal direction of the magnetic tape. In addition, the audio signals are recorded as analog signals by a fixed magnetic head on audio-recording tracks in the longitudinal direction of the magnetic tape. The audio-recording tracks offer after-recording of audio signals.

Compared to the after-recording in VHS systems, recording of encoded data with multiplexing in unit of pack as disclosed above is, disadvantageous in after-recording due to the following reasons.

Illustrated in FIG. 1 is that encoded data of video signals V1, V2 and V3 are only recorded as packs on a storage medium. SCRs are also recorded for transfer rate control that eliminates spare sectors (no signal recorded) between the sectors on which encoded video signals are recorded.

After-recording of audio signals to follow the video signals recorded as shown in FIG. 1 requires multiplexing of new packs into the packs of video signals. For such multiplexing, many packs of encoded data of video signals have to be moved onto other sectors for insertion of new packs of encoded data of audio signals.

Such pack movement during recording requires complicated control. In addition, high pack rate areas of moving picture signals, such as, the area IV shown in FIG. 1 will not accept insertion of packs of audio signals. These problems will also occur for after-recording of bitmap video signals.

SUMMARY OF THE INVENTION

A purpose of the present invention is to provide a storage medium, an apparatus and a method of recording and reproducing encoded data thereto and therefrom with after-recording of audio and/or bitmap signals.

The present invention provide a storage medium. The storage medium has a first storage area divided into a plurality of sectors having the same data capacity to store at least encoded moving picture data and encoded audio data. The storage medium also has a second storage area to store at least first information indicating whether the audio data is silence data, second information indicating an encoding method by which the audio data has been encoded and third information indicating the number of audio channels related to the audio data.

The present invention further provides a storage medium. The storage medium has a first storage area divided into a plurality of sectors having the same data capacity to store at least encoded moving picture data and encoded bitmap video data. The storage medium also has a second storage area to store at least information indicating whether the bitmap video data is invisible data.

Furthermore, the present invention provides a recording and reproducing apparatus. The apparatus has reader to read a data table from a writable storage medium including a first storage area divided into a plurality of sectors having the same data capacity, at least encoded moving picture data and first encoded audio data having been stored and a second storage area in which the data table has been stored, the table having at least first information indicating whether the first audio data is silence data, second information indicating an encoding method by which the first audio data has been encoded at a predetermined bit rate, and third information indicating the number of audio channels related to the first audio data. The apparatus also has a detector to detect the first information to determine whether the first audio data is silence data; an encoder, if the first audio data is judged as the silence data, to encode second audio data to be after-recorded by an encoding method the same as the method for the first audio data at a bit rate the same as the bit rate for the first audio data in response to the second and third information; and a writer to write the encoded second audio data over the first audio data.

Still furthermore, the present invention provides a recording and reproducing apparatus. The apparatus has a reader to read data identification information from a writable storage medium including a first storage area divided into a plurality of sectors having the same data capacity, at least encoded moving picture data and first bitmap video data having been stored and a second storage area in which the information indicating whether the bitmap video data is invisible data has been stored. The apparatus also has a detector to detect the information to determine whether the first bitmap video data is invisible data; an encoder to encode second bitmap video data to be after-recorded if the first bitmap video data is judged as the invisible data; and a writer to write the encoded second bitmap video data over the first bitmap video data.

Moreover, the present invention provides a recording and reproducing method. A datatable is read from a writable storage medium including a first storage area divided into a plurality of sectors having the same data capacity, at least encoded moving picture data and first encoded audio data having been stored and a second storage area in which the data table has been stored, the table having at least first information indicating whether the first audio data is silence data, second information indicating an encoding method by which the first audio data has been encoded at a predetermined bit rate, and third information indicating the number of audio channels related to the first audio data. The first information is detected to determine whether the first audio data is silence data. Second audio data to be after-recorded is encoded by an encoding method the same as the method for the first audio data at a bit rate the same as the bit rate for the first audio data in response to the second and third information, if the first audio data is judged as the silence data. The encoded second audio data is written over the first audio data.

Furthermore, the present invention provides a recording and reproducing method. Data identification information is read from a writable storage medium including a first storage area divided into a plurality of sectors having the same data capacity, at least encoded moving picture data and first bitmap video data having been stored and a second storage area in which the information indicating whether the bitmap video data is invisible data has been stored. The information is detected to determine whether the first bitmap video data is invisible data. Second bitmap video data to be after-recorded is encoded if the first bitmap video data is judged as the invisible data. The encoded second bitmap video data is written over the first bitmap video data.

DETAILED DESCRIPTION OF PREFERRED EMBODIMENTS

Preferred embodiments according to the present invention will be described with reference to the attached drawings.

Figure 1:
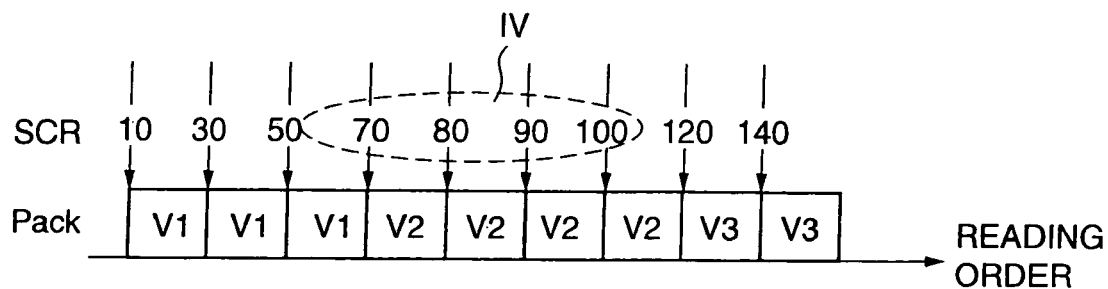
FIG. 1 illustrates encoded data of video signals and SCRs stored on a storage medium.
Figure 2:
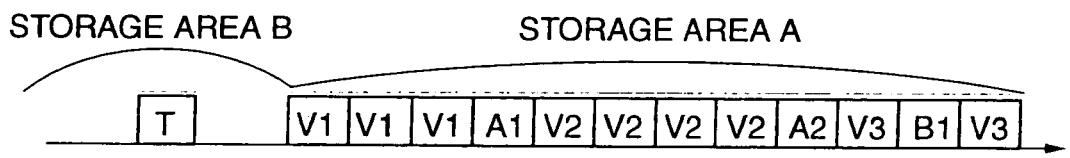
FIG. 2 illustrates encoded data of video, audio and bitmap video signals and the data table T stored on a storage medium according to the present invention.

Illustrated in FIG. 2 are storage areas of a storage medium for storing encoded data according to the present invention. The storage medium is a writable storage medium with sectors of the same data capacity.

Figure 3:
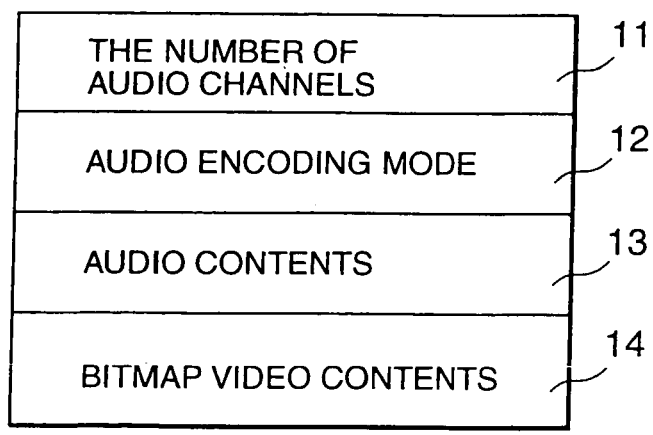
FIG. 3 illustrates the data table T.

The storage medium is provided with the first storage area A and the second storage area B. The area A stores packed moving picture, audio and bitmap video encoded data. On the other hand, the area B stores the data table T as shown in FIG. 3.

The table T contains the number of audio channels 11, audio encoding mode 12, the contents of audio data 13 and the contents of bitmap video data 14.

The number 11 is the number of channels of audio data stored in the storage area A. The encoding mode 12 identifies the encoding system, such as, linear PCM 16-bit 48 kHz quantization, according to the data format for the storage medium of the present invention. The number 11 and the encoding mode 12 are used for calculation of the bit rate of audio encoded data stored in the storage area A.

The contents 13 is one bit data indicating whether the audio data has been recorded in the storage area A with no sounds (silence data), that is, whether after-recording of audio signals is allowed. On the other hand, the contents 14 indicates whether the bitmap video data recorded in the storage area A are invisible still pictures (invisible data) that have been overlaid on the moving pictures, that is, whether after-recording of bitmap video data is allowed.

Figure 4:
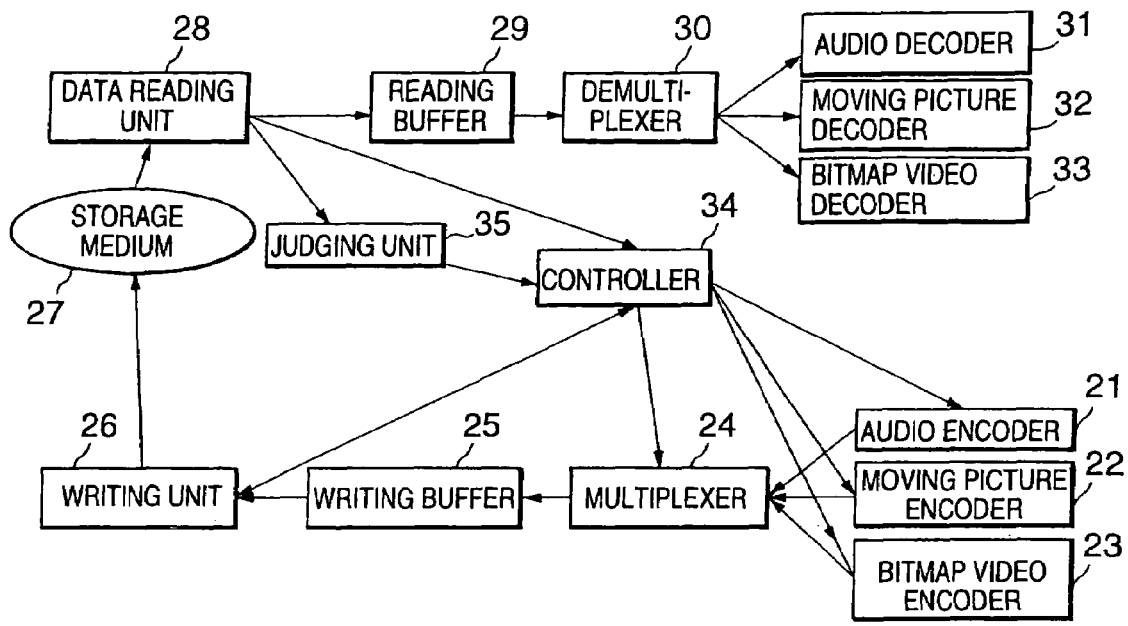
FIG. 4 shows a block diagram of a preferred embodiment of a recording and reproducing apparatus according to the present invention.

Shown in FIG. 4 is a block diagram of a preferred embodiment of a recording and reproducing apparatus according to the present invention.

In recording, encoded data of audio, video and bitmap video signals output from an audio encoder 21, a moving picture encoder 22 and a bitmap video encoder 23, respectively, are transferred to a multiplexer 24.

The encoded data are multiplexed into packs (pack data) by the multiplexer 24 while it generates time data, such as, SCRs which will be used for controlling the rate of reading after the data are stored on a storage medium 27, such as, illustrated in FIG. 2.

The pack data output from the multiplexer 24 are once stored in a writing buffer 25 and sequentially output to a data writing unit 26. The pack data are then sequentially stored on the storage medium 27 by the writing unit 26.

The pack rate of pack data, that is, pack streams, from the multiplexer 24 varies according to the VBR compression encoding processing performed for moving picture encoding. On the other hand, the rate of sequential data writing to the storage medium 27 is set at a constant rate that almost corresponds to the maximum pack rate.

Figure 5:
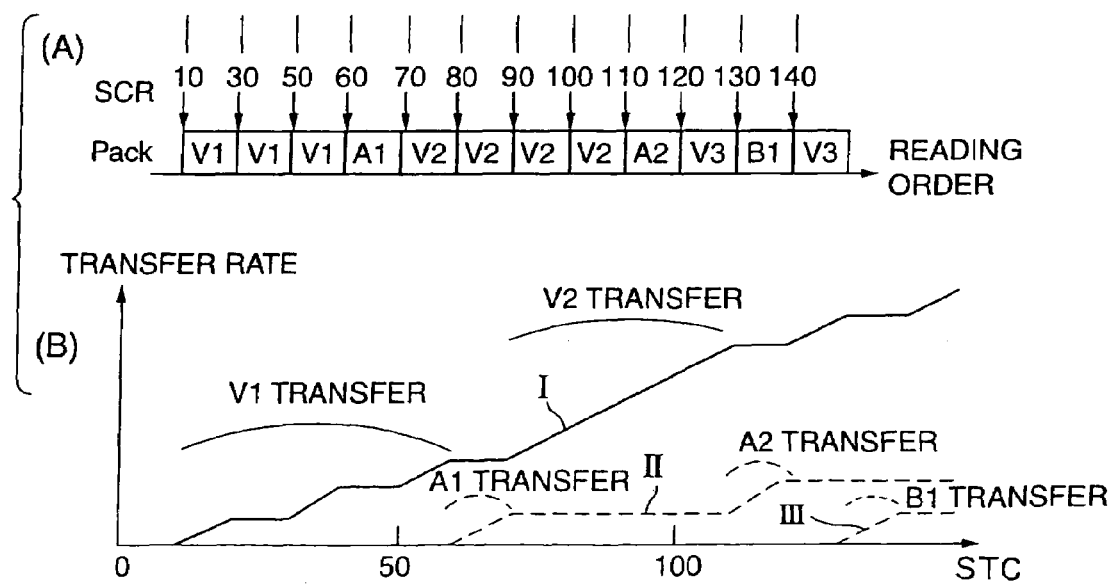
FIG. 5 illustrates how pack data are transferred to a multiplexer from encoders.

The pack data (program streams) are recorded on the storage medium 27 as illustrated in (A) of FIG. 5 in which the packs and sectors exactly meet each other. Each pack carries the encoded data of a signal, such as, a moving picture signal V1, V2 or V3, an audio signal A1 or A2 and a bitmap video signal B1. Each pack also carries time data SCR. The packs also include several data, such as, data for identifying the encoded data.

The writing operation of the data writing unit 26 is performed at a constant rate but intermittently to store the packs with no spaces as shown in (A) of FIG. 5. For the intermittent writing operation, the writing buffer 25 has a first-in first-out (FIFO) memory to hold packs that have been generated during the period of time in which no writing operations are allowed. The higher the pack rate, or the more the amount of generated encoded data, the more gradual increase in SCR. On the other hand, the lower the pack rate, the more rapid increase in SCR.

The recording operation is controlled by a controller 34, and which will be described in detail later.

Next, in reproduction, the rate of reading from the storage medium 27 is set at the same as or higher than the rate of writing. The packs read from the storage medium 27 by a data reading unit 28 are once stored in a reading buffer 29 which also has a FIFO memory. The amount of pack data held in the reading buffer 29 depends on the data amount input thereto and output therefrom. The reading unit 28 intermittently reads the pack data from the storage medium 27 and intermittently outputs the data to the reading buffer 29 to regulate the amount of data held in the reading buffer 29 with no data overflow.

The pack data of the reading buffer 29 are transferred to a demultiplexer 30. The SCR of a pack appeared at the output of the reading buffer 29 is compared with the present system time clock (STC) by the demultiplexer 30. Whenever both SCR and STC are equal to each other, the pack data are transferred to an audio decoder 31, a moving picture decoder 32 and a bitmap video decoder 33 according to the content information carried by the packs. The decoders 31, 32 and 33 output the moving picture signals, audio signals and bitmap signals that are in synchronism with each other, the same as those when recorded.

Disclosed with reference to (B) of FIG. 5 is how the pack data were transferred from the demultiplexer 30 to the audio decoder 31, the moving picture decoder 32 and the bitmap video decoder 33.

In (B) of FIG. 5, the transfer rates indicated by the slope of graphs were predetermined, and the amount of data in each pack was a constant amount, so that the increment of SCR did not go under 10. The graphs I, II and III represent how the pack data were transferred to the moving picture decoder 32, the audio decoder 31 and the bitmap video decoder 33, respectively.

It is understood from the graph I that the video encoded pack data V1 were transferred intermittently according to the SCR values 10, 30 and & 50 shown in (A) of FIG. 5; on the other hand, the video encoded pack data V2 the amounts of which were larger than those of video pack data V1 were successively transferred.

The audio pack data A1 and A2 were transferred almost at a constant interval as indicated by the graph II and also even outside the range of the graph because these data had been encoded by the CBR compression encoding processing.

The transfer of the bitmap pack data B1 occurred at regular intervals. This is, however, very rare because the display of these data will be updated at irregular intervals and the display of the same data will continue until the display of the next data.

The features of the present invention will be described in detail again with reference to FIG. 4.

According to reading information from the data reading unit 28, the controller 34 controls the audio encoder 21 and the multiplexer 24 so that the video data encoded by the VBR compression encoding processing and the audio data encoded by the CBR compression encoding processing are packed at the amount corresponding to the capacity of the sectors of the storage medium 27.

The pack data are supplied to the data writing unit 26 through the writing buffer 25 and stored on the storage medium 27. The pack data are stored in the first storage area A with the data indicating whether the audio data has been recorded with no sounds and data indicating at least the audio encoding mode and the number of audio channels in the storage area B, as shown in FIGS. 2 and 3.

Described next is the after-recording of audio signals, which is one of the features of the present invention.

The storage medium 27 has been prepared for this embodiment such that moving picture pack data encoded by the VBR compression encoding processing and audio pack data (including silence data) encoded by the CBR compression encoding processing have been put in packs, a data amount of each pack corresponding to the capacity of each sector, before multiplexed and sequentially stored from the head sector of the first storage area A. Bitmap video data may also have been recorded but which is not a must in this embodiment.

Figure 6:
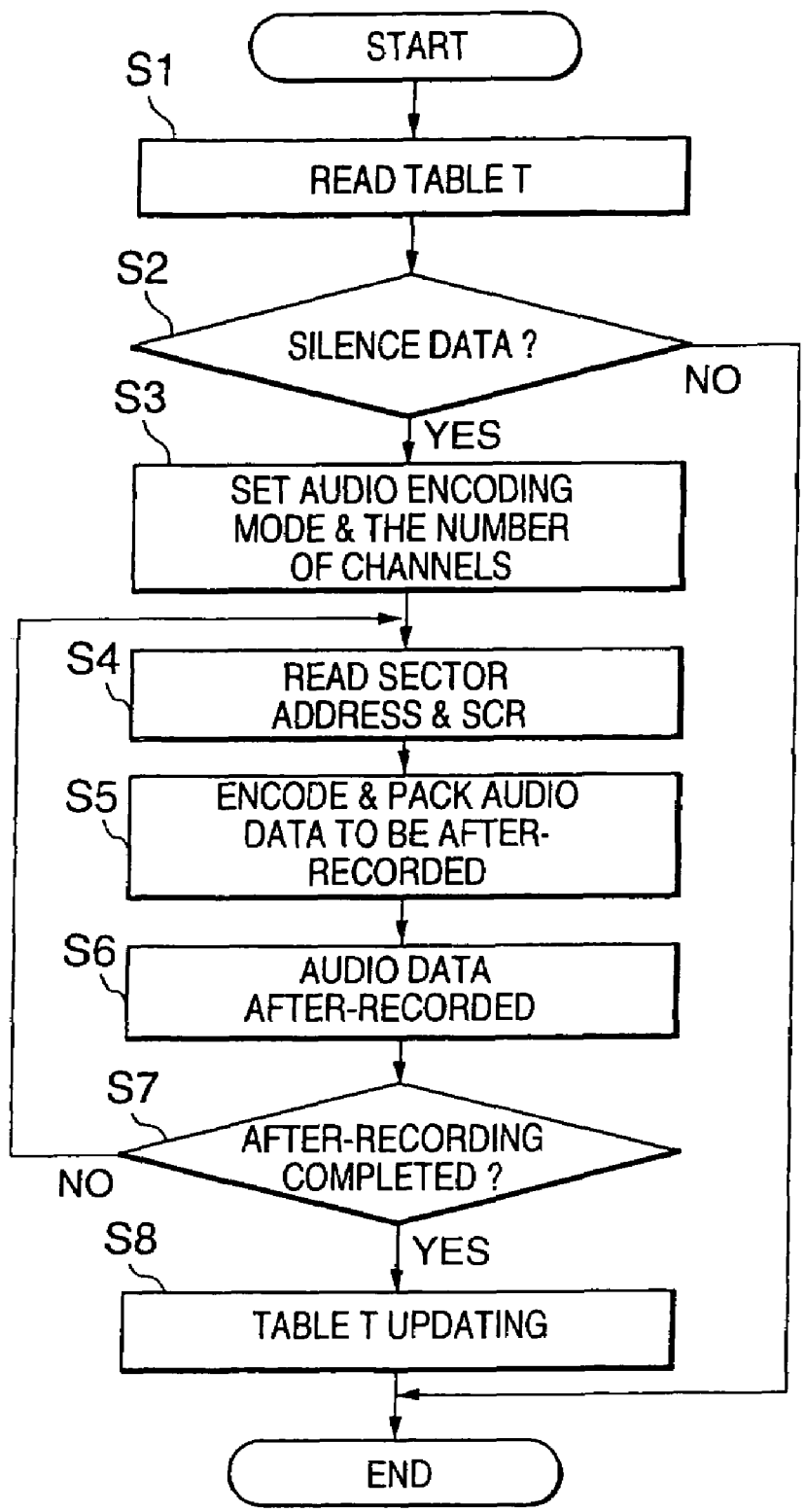
FIG. 6 is a flow chart explaining the process of after-recording of audio signals according to the present invention.

After-recording of audio signals is described in detail with reference to FIG. 4 and also the flowchart shown in FIG. 6.

In STEP S1, the data table T (FIG. 3) stored in the storage area B of the storage medium 27 is read by the data reading unit 28 and transferred to a judging unit 35. The judging unit 35 determines whether the recorded audio data is silence data according to the audio content data 13 in STEP S2. If it is the silence data, the judging unit 35 judges that after-recording of audio signal is allowed. The judgement is then informed to the controller 34. If it is sound data, however, after-recording is prohibited.

Next, in STEP S3, the controller 34 sets the audio encoder 21 in the encoding mode that is the same for the recorded audio data according to the encoding mode 12 to accept the number of audio channels 11 listed in the table T.

The controller 34 reads, in STEP S4, the sector addresses and SCRs of the audio pack data recorded in the first storage area A of the storage medium 27 through the data reading unit 28.

In STEP S5, the audio encoder 21 starts encoding of the audio signals to be after-recorded, and the controller 34 controls the multiplexer 24 to pack the audio data (to be after-recorded) sent from the audio encoder 21 and multiplex the SCRs and the pack audio data so that each audio data pack includes the corresponding SCR. During this encoding operation, the moving picture encoder 22 and the bitmap video encoder 23 are set in the waiting mode so that no code data of moving picture and bitmap video signals are transferred to the multiplexer 24.

The audio pack data (to be after-recorded) are transferred from the multiplexer 24 to the data writing unit 26 through the writing buffer 25. The controller 34 controls, in STEP S6, the data writing unit 26 to selectively overwrite the audio pack data (to be after-recorded) on the sectors on which audio data have already been recorded according to the sector addresses read by the controller 34. The after-recording is performed without any movement of audio data packs.

Then, in STEP S7, the controller 34 determines whether the after-recording is completed, and if so, the controller 34 updates, in STEP S8, the audio contents 13 (indicating silence data) in the table T recorded on the storage medium 27 so that the contents 13 indicates sound data.

If the after-recording is not completed in STEP S7, the process returns to STEP S4, and the controller 34 reads the sector addresses and SCRs of the next audio pack data.

The encoding and packing of audio data to be after-recorded in STEP S5 can be performed before the reading of sector addresses and SCRs in STEP S4.

Figure 7:
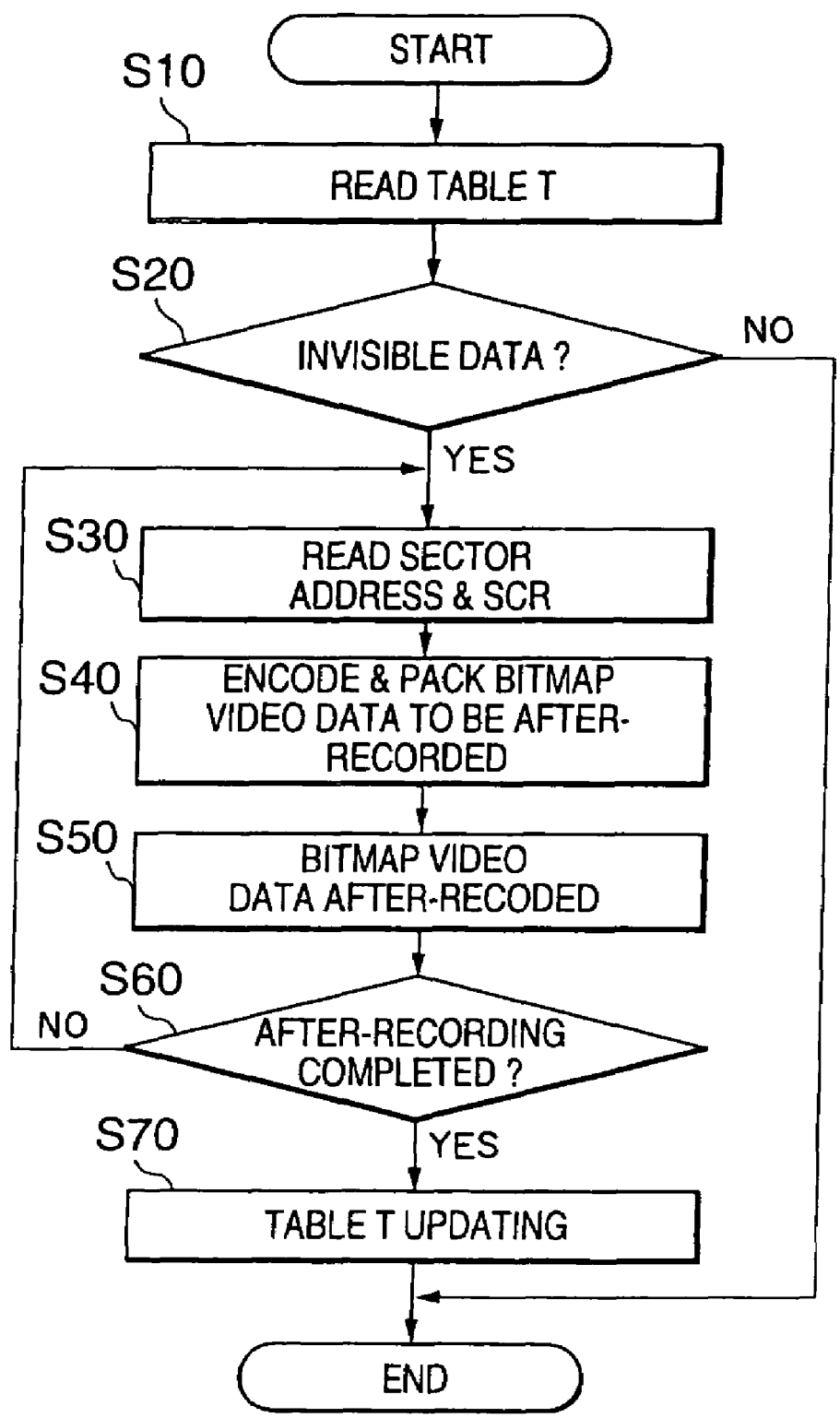
FIG. 7 is a flow chart explaining the process of after-recording of bitmap video signals according to the present invention.

Next, after-recording of bitmap video signals, which is another feature of the present invention, is described in detail with reference to the flowchart shown in FIG. 7.

The storage medium 27 is prepared for this embodiment such that moving picture pack data encoded by the VBR compression encoding and a plurality of bitmap video data (including invisible data) have been put in packs, a data amount of each pack corresponding to the capacity of each sector, before multiplexed and sequentially stored from the head sector of the first storage area A. The bitmap video data will be overlaid on the moving pictures and updated. Audio data may also have been recorded but which is not a must in this embodiment.

In STEP S10, the data table T (FIG. 3) stored in the storage area B of the storage medium 27 is read by the data reading unit 28 and transferred to the judging unit 35. The judging unit 35 determines whether the recorded bitmap video data is invisible data according to the bitmap video content data 14 in STEP S20. If it is the invisible data, the judging unit 35 judges that after-recording of bitmap video signal is allowed. The judgement is then informed to the controller 34. If it is visible data, however, after-recording is prohibited.

Next, the controller 34 reads, in STEP S30, the sector addresses and SCRs of the bitmap video data recorded on the first storage area A of the storage medium 27 through the data reading unit 28.

In STEP S40, the bitmap video encoder 23 starts encoding of the bitmap video signals to be after-recorded; the controller 34 selects SCRs that are closest to the timing of after-recording among the read SCRs and transfers the selected SCRs to the multiplexer 24; and the controller 34 controls the multiplexer 24 to pack the bitmap video data (to be after-recorded) sent from the bitmap video encoder 23 and multiplex the SCRs and the pack bitmap video data so that each bitmap video data pack includes the corresponding SCR. During this encoding operation, the audio encoder 21 and the moving picture encoder 22 are set in the waiting mode so that no code data of audio and moving picture signals are transferred to the multiplexer 24.

The bitmap video pack data (to be after-recorded) are transferred from the multiplexer 24 to the data writing unit 26 through the writing buffer 25. The controller 34 controls, in STEP S50, the data writing unit 26 to selectively overwrite the bitmap video pack data (to be after-recorded) on the sectors on which bitmap video data have already been recorded according to the sector addresses read by the controller 34. The after-recording is performed without any movement of bitmap video packs.

Then, in STEP S60, the controller 34 determines whether the after-recording is completed, and if so, the controller 34 updates, in STEP S70, the bitmap video contents 14 (indicating invisible data) in the table T recorded on the storage medium 27 so that the contents 14 indicates visible data.

If the after-recording is not completed in STEP S60, the process returns to STEP S30, and the controller 34 reads the sector addresses and SCRs of the next video pack data.

The encoding and packing of video data to be after-recorded in STEP S40 can be performed before the reading of sector addresses and SCRs in STEP S30.

After-recording of bitmap video signals are performed as disclosed above, however, after-recording depends on the timing of recording of the initial invisible bitmap video data on the storage medium 27. Bitmap video data can be multiplexed in the initial recording at any timing set by the user, such as, for every one second at the constant timing.

As disclosed above, according to the present invention, when the content of recorded audio data is judged as silence data, new audio data is overwritten (after-recorded) on the recorded audio data by the same encoding method at the same constant bit rate. The after-recording can be performed without movement of packs of recorded audio data.

Furthermore, according to the present invention, when the content of recorded bitmap video data is judged as invisible data, new bitmap video data is overwritten (after-recorded) on the recorded bitmap video data at any predetermined timing for display. This after-recording also can be performed without movement of packs of recorded bitmap data.

What is claimed is:

1. A writable storage medium comprising:
   a first storage area divided into a plurality of sectors having the same data capacity;
   a second storage area involved in the first storage area, storing a plurality of moving picture packs of moving picture data encoded by variable bit rate compression encoding and a plurality of audio packs of audio data encoded by constant bit rate compression encoding, the moving picture packs and the audio packs being multiplexed per pack and stored sequentially from a specific sector among the sectors, each pack corresponding to a unit of data transfer and containing data an amount of which is equal to the data capacity of each sector, and each pack being formed in a program stream defined in MPEG standards; and
   a third storage area involved in the first storage area but located different from the second storage area, the third storage area storing a table listing at least first information indicating whether after-recording to the audio data is allowable, second information indicating an encoding method by which the audio data has been encoded and third information indicating the number of audio channels of the audio data.

2. A recording and reproducing apparatus comprising:

a reader to read a data table from a storage medium including a first storage area divided into a plurality of sectors having the same data capacity, a second storage area involved in the first storage area, storing a plurality of moving picture packs of moving picture data encoded by variable bit rate compression encoding and a plurality of audio packs of audio data encoded by constant bit rate compression encoding, the moving picture packs and the audio packs being multiplexed per pack and stored sequentially from a specific sector among the sectors, each pack corresponding to a unit of data transfer and containing data an amount of which is equal to the data capacity of each sector, and each pack being formed in a program stream defined in MPEG standards, and a third storage area involved in the first storage area but located different from the second storage area, the third storage area storing a table listing at least first information indicating whether after-recording to the audio data is allowable, second information indicating an encoding method by which the audio data has been encoded, and third information indicating the number of audio channels of the audio data;

a reader to read out the table stored in the third storage area of the storage medium for after-recording of audio signals;

a detector to detect the first information from the table to determine whether after-recording to the audio data stored in the second storage area of the storage medium is allowable;

an encoder, if after-recording to the audio data is judged as allowable, to encode the audio signals to be after-recorded by an encoding method the same as the method for the audio data at a bit rate the same as a bit rate for the audio data based on the second and third information on the table; and a writer to pack audio data of the encoded audio signals for producing audio packs to be after-recorded and overwrite the packs to be after-recorded on the sectors on which the audio data has been stored in the second storage area of the storage medium.

3. A method of recording to a storage medium having a first storage area divided into a plurality of sectors having the same data capacity, the method of comprising the steps of:

packing moving picture data encoded by variable bit rate compression encoding and audio data encoded by constant bit rate compression encoding into a plurality of moving picture packs and a plurality of audio packs, each pack corresponding to a unit of data transfer and containing data an amount of which is equal to the data capacity of each sector, and each pack being formed in a program stream defined in MPEG standards;

multiplexing the moving picture packs and the audio packs per pack and recording the multiplexed packs in a second storage area involved in the first storage area of the storage medium, sequentially from a specific sector among the sectors; and recording a table listing at least first information indicating whether after-recording to the audio data is allowable, second information indicating an encoding method by which the audio data has been encoded, a third information indicating the number of audio channels of the audio data, in a third storage area involved in the first storage area but located different from the second storage area of the storage medium.

* * * * *